Nov. 1, 1955     M. G. PAWLEY     2,722,602

SATURABLE REACTOR CONTROLLED DELAY MULTIVIBRATOR

Filed March 15, 1951

INVENTOR.
Myron G. Pawley
BY
Q. Baxter Warner
ATTORNEY

United States Patent Office 2,722,602
Patented Nov. 1, 1955

2,722,602

SATURABLE REACTOR CONTROLLED DELAY MULTIVIBRATOR

Myron G. Pawley, Alexandria, Va., assignor to the United States of America as represented by the Secretary of the Navy Application March 15, 1951, Serial No. 215,850

3 Claims. (Cl. 250—27)

(Granted under Title 35, U. S. Code (1952), sec. 266)

The present invention relates generally to multivibrators, and more particularly to a delay multivibrator whose output pulse width may be varied or controlled in response to factors outside of the multivibrator circuit itself.

Multivibrators which generally produce a square wave output in response to a trigger pulse input are well known, and many types have been designed. Furthermore, it is well known that the pulse width of the output of multivibrators may be varied by varying the RC time constant of the circuit, or by varying the bias on one of the multivibrator tubes. In accordance with the present invention, however, it has been found that by coupling a variable reactor to the cathode circuit of a delay multivibrator, the pulse width of the multivibrator output may be varied, since variations in the effective inductance cause corresponding changes in the time constant of the cathode circuit. It is contemplated by the present invention that variable inductances of different types may be thus used for obtaining the desired variation in output pulse width, or that a saturable reactor may be employed to obtain variations in pulse width by applying a variable D. C. control voltage to the reactor. It is further contemplated by the present invention that this variable reactance controlled delay multivibrator may be used as a measuring circuit, wherein changes in the effective inductance, or changes in the D. C. control voltage when a saturable reactor is employed, are measured by the resultant changes in output pulse width of the multivibrator.

It is therefore one object of the present invention to provide a variable reactance controlled delay multivibrator, whose output pulse width is controlled by said reactance, or whose variations in output pulse width are measures of the reactance changes.

Another object of the present invention is to provide a saturable reactor controlled delay multivibrator, whose output pulse width varies as a function of the effective inductance of said reactor, and whose variations in output pulse width are measures of the variations in the effective inductance of said reactor.

Another object of the present invention is to provide a variable reactance controlled delay multivibrator, the reactance comprising a reactor shunted by a variable capacitance, whose output pulse width varies as a function of the effective inductance of said reactance, and whose variations in output pulse width are measures of the variations in the effective inductance of said reactor.

Other objects and advantages of the present invention will become apparent to those skilled in the art from a consideration of the following detailed description thereof, made in conjunction with the accompanying drawings in which.

Figure 1:
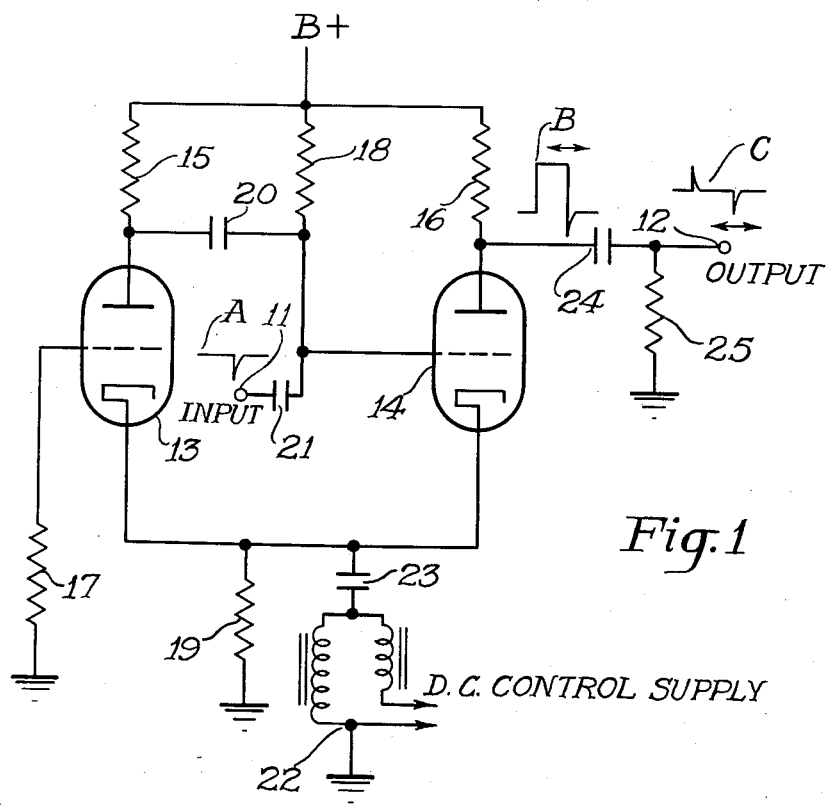
Fig. 1 is a wiring diagram of a saturable reactor controlled monostable delay multivibrator, whose cathodes are coupled through a common resistor and to whose cathode circuit is coupled a saturable reactor.

Referring to the drawings, the monostable delay multivibrator there shown has a negative trigger pulse input at 11 and an output at 12, and this circuit includes the two vacuum tubes 13 and 14, shown as triodes, which if desired may be a single twin triode such as the type 2C51, the two plate resistors 15 and 16, the grid resistors 17 and 18, the cathode resistor 19, the plate-grid coupling capacitor 20, and the trigger input coupling capacitor 21. In addition thereto, this multivibrator circuit as shown in Fig. 1 is provided with a saturable reactor 22 coupled to the cathode circuit through the capacitor 23, and the reactor is provided with a D. C. control supply far varying the effective inductance thereof. Also, where found desirable, the output of the multivibrator may include an RC differentiating circuit, capacitor 24 and resistor 25.

The values of the elements composing the present circuit and the supply voltage therefor are so chosen that when the circuit is in the stable state tube 14 is conducting heavily, thus imposing through the voltage drop across resistance 19 a potential difference between the cathode and grid of tube 13 which places the latter tube below its cutoff point. However, upon the application of a negative trigger pulse, indicated at A, to the input 11 of the multivibrator circuit, the pulse is passed by the capacitor 21 and applied to the grid of tube 14. The resultant decrease in grid voltage cuts down the plate current of tube 14 and hence the voltage drop across resistance 19, thereby increasing the grid voltage of tube 13 and causing this tube to become conductive. The flow of current through tube 13 decreases its plate potential, which decrease is coupled through the capacitor 20 to the grid of tube 14 to further decrease the grid voltage of this tube. The resultant further decrease in plate current of tube 14 causes a further increase in plate current of tube 13, and this cycle is repeated until tube 14 is cut off. For a time interval, determined largely by the RC time constant of capacitor 20 and resistor 18, capacitor 20 continues to charge under the potential difference existing between the plate of tube 13 and the grid of tube 14. However, after a period of time as capacitor 20 charges, the grid voltage of tube 14 is elevated to the tube's cutoff level, and the tube again begins to conduct, reversing the process whereby tube 14 was cut off, again cutting off tube 13, and returning the multivibrator circuit to the stable condition. The sequence described in cutting off tube 14 after introduction of signal A into the multivibrator circuit is substantially instantaneous in occurrence, and the reverse sequence of cutting off tube 13 and returning the circuit to stable state is likewise substantially instantaneous. Thus, the plate potential of tube 14 provides a square wave output pattern B, which rises almost instantaneously from the stable state level to the full B+ potential, as tube 14 is cut off, and then remains at that level until tube 14 again begins to conduct; whereupon, the output drops almost instantaneously to its stable state level. If desired, the square wave B may be differentiated to provide the output pattern shown at C.

Since in the operation of the multivibrator circuit as above-described the voltage drop across resistor 19 varies, so the voltage drop across the inductive reactor 22 must likewise vary; and since this reactor is coupled to the cathode circuit of the multivibrator, it affects the time constant of this circuit. Furthermore, variations in the effective inductance of the reactor provide corresponding variations in the time constant of the cathode circuit, and therefore accordingly vary the output pulse width of the square wave B or the time delay between the two pulses of the differentiated output C. Changes in pulse width of pattern B or changes in time delay between pulses of pattern C are therefore functions and measures of the effective inductance of changes of reactor 22. To use the above-described device as a measuring circuit, the measurements are presented in the form of D. C. control currents applied to the D. C. winding of the saturable reactor 22, thereby varying the effective inductance of the A. C. winding of the reactor, and hence varying the output pulse width of the multivibrator.

Figure 2:
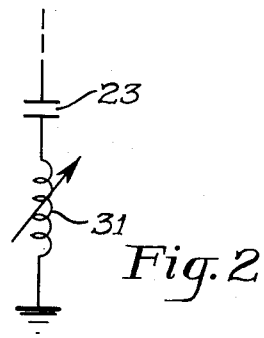
Fig. 2 is a representation of a variable reactor which may be used in place of the saturable reactor of Fig. 1.
Figure 3:
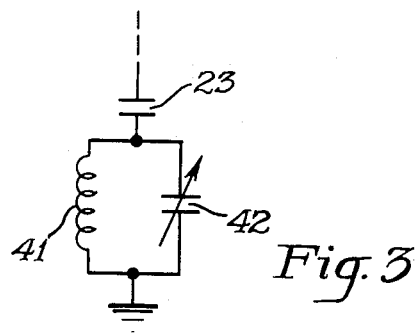
Fig. 3 is a representation of a reactor shunted by a variable capacitor which may be used in place of the saturable reactor of Fig. 1.

As will be apparent to those skilled in the art, results indicated above may also be had by substituting a variable reactor 31 for the saturable reactor 22, as indicated in Fig. 2. As an additional modification, the saturable reactor 22 may be replaced by a reactor 41 shunted by a variable capacitor 42, as indicated in Fig. 3. In the former modification, the desired effect on the multivibrator cathode circuit time constant is had by mechanical displacements in the core or air gap of the variable reactor; while in the latter modification, variations in the effective inductance of reactor 41 are had by adjustments of the variable capacitor 42. Other modifications of the present invention than those here suggested will be apparent to those skilled in the art, and those modifications which are within the spirit and scope of the appended claims are within the contemplation of the present patent.

The invention described herein may be manufactured and used by or for the Government of the United States of America for governmental purposes without the payment of any royalties thereon or therefor.

What is claimed is:

1. A variable delay multivibrator comprising, a pair of interconnected vacuum tubes each having at least anode, cathode, and control grid electrodes, a resistance-capacitance coupling between the anode of one tube and the control grid of the other to provide a first interconnection, a common cathode resistor connected to the cathodes of both tubes for carrying all the cathode current therefor and providing a second interconnection, a saturable reactor capacitively coupled in parallel with said cathode resistor and having a pair of terminals for connecting to a direct current control supply to control the time constant of said second interconnection, a trigger pulse input terminal connected to the control grid of one of said tubes and a variable delay pulse output terminal connected to an anode of one of said tubes.

2. A variable delay multivibrator comprising, a pair of interconnected vacuum tubes each having at least anode, cathode, and control grid electrodes, a resistance-capacitance coupling between the anode of one tube and the control grid of the other to provide a first interconnection, a common cathode resistor connected to the cathodes of both tubes for carrying all the cathode current therefor and providing a second interconnection, a pair of serially connected saturable reactors, one of said saturable reactors being capacitively coupled in parallel with said cathode resistor, a pair of control terminals for serially connecting said saturable reactors to a direct current control supply to control the time constant of said second interconnection, a trigger pulse input terminal connected to the control grid of one of said tubes, and a variable delay pulse output terminal connected to an anode of one of said tubes.

3. A variable delay device comprising, a cathode-coupled monostable multivibrator including a pair of electron tubes and a common cathode resistor carrying all the cathode current of both tubes, a saturable reactor connected in parallel with said cathode resistor for alternating current and isolated from said resistor for direct current, means for connecting a direct current control supply to said saturable reactor for controlling the time constant of the common cathode circuit, a trigger pulse input terminal connected to a control grid of the normally conducting tube, and a variable delay pulse output terminal connected to the anode of said last named tube.

References Cited in the file of this patent

UNITED STATES PATENTS

| | | |
|---|---|---|
| 2,300,996 | Vanderlyn et al. | Nov. 13, 1942 |
| 2,417,522 | Shenk | Mar. 18, 1947 |
| 2,479,954 | Moore | Aug. 23, 1949 |
| 2,562,530 | Dickinson | July 31, 1951 |
| 2,572,016 | Elbourn | Oct. 23, 1951 |
| 2,610,298 | Zaloudek | Sept. 9, 1952 |